Sept. 4, 1973  J. S. SMATKO  3,756,857
SUBSTANTIALLY NON-GASSING ALKALI RESISTANT BATTERY
SEPARATOR AND METHOD OF PRODUCTION
Filed Oct. 23, 1970
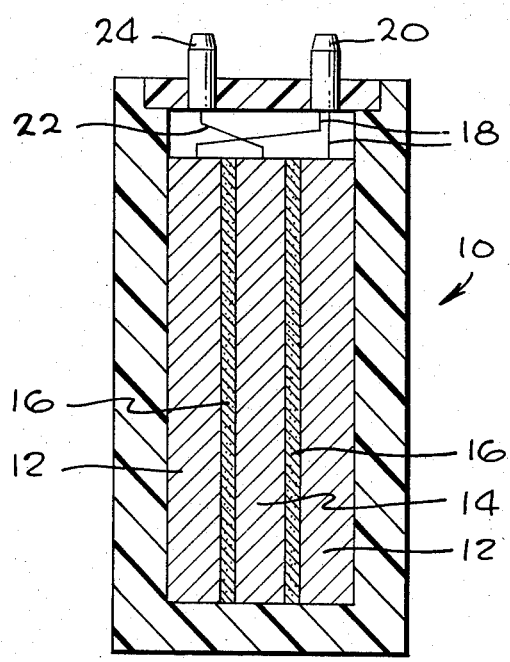
JOSEPH S. SMATKO
*INVENTOR.*
BY
ATTORNEY

United States Patent Office 3,756,857
Patented Sept. 4, 1973

3,756,857
SUBSTANTIALLY NON-GASSING ALKALI
RESISTANT BATTERY SEPARATOR AND
METHOD OF PRODUCTION
Joseph S. Smatko, Santa Barbara, Calif., assignor to McDonnell Douglas Corporation, Santa Monica, Calif.
Filed Oct. 23, 1970, Ser. No. 83,315
Int. Cl. H01m 3/02, 41/00
U.S. Cl. 136—30                                    18 Claims

ABSTRACT OF THE DISCLOSURE

Production of inorganic porous sintered battery separator substantially eliminating formation of gas when in contact with a zinc electrode, and permitting long cycle life of a high energy density battery such as a silver-zinc battery, produced according to one embodiment by initially firing a mixture of magnesium-bearing material, e.g., MgO, manganese-bearing material, e.g., MnO, and silica ($SiO_2$), at temperature in the range of about 1,100 to about 1,400° C., to produce a magnesium silicate-manganese silicate composition, granulating and compacting said composition into plaques, and sintering said compacted plaques at temperature ranging from about 1,000 to about 1,300° C., to produce porous sintered separator members, in the form of a sintered solid solution of magnesium silicate and manganese silicate, having good transverse strength and low resistivity.

---

This invention relates to batteries, particularly high energy density batteries and is especially concerned with the production of improved inorganic members or separators for use in such batteries, especially a high energy density battery containing a zinc electrode, such separators being substantially free from any tendency to cause gassing when in contact with a zinc electrode, thereby permitting production of hermetically sealed batteries of this type having extended life, which can operate as a secondary battery over a large number of charge-discharge cycles efficiently; with novel procedure for producing such separators; and with improved battery constructions embodying such improved separators.

Batteries are an important source of energy storage for power generation. An important type of battery particularly suited for such applications are the high energy density alkaline electrolyte cells such as the silver-zinc, zinc-air and nickel-zinc batteries. High energy density batteries are generally battery systems which have a substantially higher energy per unit of weight than conventional, e.g., lead, storage batteries. In addition to important airborne applications, such high energy density batteries have many other applications such as in portable tools and appliances, television, radio and record players, engine starting, portable X-ray units and the like.

In high energy density batteries such as silver-zinc and nickel-zinc batteries, the electrodes are placed adjacent opposite sides of a membrane or separator which performs the function of retaining electrolyte, separating the electrodes, and permitting transfer of electrolyte ions while inhibiting migration of electrode ions. For activation of these batteries, the battery or the components thereof such as the separator are filled with an aqueous alkaline electrolyte in the form of an aqueous solution of an alkali such as potassium hydroxide.

High energy density batteries of the above type, particularly those employing an inorganic separator, are particularly useful as secondary batteries which can be charged and discharged periodically, and can operate at elevated as well as at normal temperatures.

One form of particularly useful inorganic separator for such high energy density batteries, such as silver-zinc batteries is disclosed in Pat. No. 3,446,668. Such inorganic separator is in the form of a sintered porous member composed of magnesium silicate and iron silicate. According to the patent, such separators in addition to being formed from synthetic mixtures of iron-bearing material, magnesium-bearing material, and silica, can be formed from the naturally occurring mineral olivine, a magnesium-iron silicate.

Although the magnesium silicate-iron silicate separator of the above patent has proved successful in high energy density batteries, including silver-zinc batteries when such batteries or cells are vented, it has been found from experience that cells incorporating such separators and containing a zinc electrode, eventually develop gas. Thus, when non-vented or sealed cells such as a sealed silver-zinc battery containing the above noted magnesium silicate-iron silicate separator is cycled, such batteries eventually develop gas, although such cells can be cycled from about 12 to about 80 cycles on shallow cycling regimes without excessive pressure rise. However, thereafter such cells gas significantly during overcharge, and on standing, and in due course of time the pressure rise is sufficiently great to present the danger of rupture of the battery case. Analysis of the gas generated in such batteries shows the major component to be hydrogen.

Tests have been devised to determine the gassing potential of the various cell components. One such test is based on mixing a predetermined weight of test material, such as particulate sintered magnesium silicate-iron silicate separator material produced according to the above patent, with a pre-established amount of zinc powder, compressing the mixture and then exposing the compressed pellet to about 30% KOH solution. The gas produced is collected and measured over a certain time period, the amount of gas collected providing a measure of the degree of activity toward gassing of the above noted separator material in contact with the zinc. This test showed that the magnesium silicate-iron silicate separator material of the above patent is very prone to cause gassing when in contact with zinc.

Attempts were made to de-activate the gassing sites with sulfide treatment or with quinoline, but these failed to yield a long term and satisfactory solution to the gassing problem of the magnesium silicate-iron silicate separator material. Other attempts involved the application of a thin coating of a non-gassing ceramic material such as zirconia on the sintered magnesium silicate-iron silicate, or olivine, separator member of the above patent. At best, this latter technique served only to delay to a minor extent the onset of significant gassing when such coated separator was used in a silver-zinc cell, but did not provide a satisfactory solution according to the procedure of the above patent.

In accordance with the present invention, it has been found that porous members or membranes in the form of a sintered magnesium silicate-manganese silicate composition, which is preferably substantially free of iron, provide separators which are substantially non-gassing when in contact with a zinc electrode in a battery, and overcoming the disadvantages of the above noted magnesium silicate-iron silicate separators of the above patent, and affording a high energy density battery containing a zinc electrode, which has a long cycle life yet which can be hermetically sealed.

Briefly, the substantially non-gaseous separator according to the invention, when employed with a zinc electrode, and which has good resistance to alkali, good strength and low resistivity, is produced by sintering a compacted magnesium silicate-manganese silicate composition at temperature ranging from about 1,000 to about 1,300° C. The magnesium silicate-manganese silicate composition can be derived from naturally occurring minerals of this composition, but this is a rare mineral form and hence is not preferred as the source material. Such magnesium silicate-manganese silicate composition is generally produced from a synthetic starting mixture of the magnesium-bearing, manganese-bearing and silica-bearing materials.

Hence, in the general practice for carrying out the ingassing magnesium silicate-manganese silicate separator hereof, a synthetic mixture of suitable magnesium-bearing, manganese-bearing and $SiO_2$-bearing materials are mixed generally in proportions of about 2 to about 57%, preferably about 23 to about 56%, magnesium or magnesium-bearing material or compound calculated as MgO, about 1 to about 68%, preferably about 2 to about 41%, manganese or manganese-bearing material or compound calculated as MnO, and about 15 to about 55%, preferably about 25 to about 48%, of silica ($SiO_2$), by weight.

Suitable magnesium-bearing materials are magnesium compounds which can be employed are, for example, magnesium carbonate, magnesium sulfate, magnesium nitrate, magnesium chloride, magnesium silicate and magnesium oxide, and the naturally occurring minerals talc, Enstatite, Magnesite and Forsterite.

Suitable manganese-bearing materials or manganese compounds which can be employed include, for example, manganese carbonate, manganese nitrate, manganese monoxide, manganese dioxide, either synthetic or in the form of the high purity grade "pyrolusite," which is the natural manganese dioxide, manganese sulfate, and manganese chloride.

As a source of suitable $SiO_2$-bearing materials, there can be employed, for example, flint, silica, sand, diatomaceous earth, fume silica, magnesium silicate, silica gel and silicic acid.

In preferred practice for producing the non-gassing separator when in contact with zinc according to the invention, the content of impurities in the form of metals such as iron, nickel and cobalt in the above noted source materials should be low since such metals when present in the final separator produce low hydrogen overvoltages when in contact with zinc. Thus, it is preferred that the source materials be substantially free of iron, nickel and cobalt, and contain very little, if any, of such metals, preferably not in excess of about 1% calculated as FeO, total of such metals by weight of the total inorganics content of the starting mixture. However, in certain instances larger amounts of such metals can be tolerated, but are not preferred.

Various methods can be employed for preparing the raw material mixtures. According to one procedure the various components, that is the magnesium compound, the manganese compound and the silica-bearing material or compound can be mixed and the mixture first ground to relatively fine particle size. Alternatively, to produce starting mixtures of small particle sizes and intimate contact of particles a precipitation reaction or procedure can be employed. In such procedure, for example, silica such as fume silica can be slurried together with the magnesium compound, for example fine dense magnesia, in a solution of a soluble manganese compound such as manganese nitrate, the ratios of such components being chosen to provide the correct ratios of net oxides within the ranges noted above, upon firing. With vigorous stirring, ammonia is added to precipitate the manganous hydroxide. Filtration and washing can be conducted if desired, to remove soluble ammonium nitrate and the resulting heavy paste dried to form a crumbly mass. Where such filtration is not carried out, the mass is fired at temperature of about 400 to about 800° C. to eliminate the ammonium nitrate and the major portion of the water, and the resulting mass is then granulated and powdered to produce an intimate mixture of the magnesium-bearing and manganese-bearing materials in the form of their oxides, and the silica. In the above precipitation procedure, instead of ammonia, other precipitants can be employed such as amonium carbonate, sodium hydroxide, or sodium carbonate, and when using either of the latter two precipitants, it is necessary to wash out the sodium salts prior to subsequent firing. The final precipitated slurry or paste has the respective derived oxides, or hydroxides, or carbonates very intimately mixed and in very fine particle size, e.g., below 10 microns.

In either of the procedures noted above for producing the mixture of starting materials of fine particle size, to such mixture there can then be added a small amount, e.g., about 2 to about 10% of an organic binder, by weight, of total inorganics, such as a polyethylene glycol, e.g., Carbowax, beeswax, paraffin wax or whale wax, generally dissolved in a suitable solvent such as acetone or toluene, and the resulting mixture dried, e.g., at ambient temperature or at elevated temperature to remove solvent. Although the addition of an organic binder is not necessary, it is preferred to employ such binder in order to provide adequate "green strength" for handling the mixture.

The resulting mass is then pressed into blocks at pressures of about 2,000 to about 20,000 p.s.i., the presence of the binder aiding in this operation. Where a binder is present, such blocks are then fired first in air at temperature of the order of about 400 to about 600° C. for a period of about 15 minutes to about 4 hours, to remove the organic binder. The blocks are then fired at temperature of the order of about 1,100° C. to about 1,400° C. The latter firing operation is generally carried out for a period of about 1 to about 8 hours, and such firing causes reaction of the magnesium and manganese compounds to form the magnesium silicate-manganese silicate composition.

It is preferred to carry out the latter firing operation for converting the initial starting components to the magnesium silicate-manganese silicate solid composition at the upper portion of the latter temperature range, that is at between about 1,300 to about 1,400° C. in order to obtain complete reaction. Otherwise, when employing initial firing temperature ranging between about 1,100° C. and below about 1,300° C., for 8 hours or less, a second reaction firing may be necessary to obtain the above noted magnesium silicate-manganese silicate composition.

As previously noted, during such firing operation at the high temperatures, the magnesium-bearing and manganese-bearing materials or compounds, are converted to the oxides and then by reaction forming with the silica component the magnesium silicate-manganese silicate having the general formula:

$$2(Mg_a \cdot Mn_b)O \cdot SiO_2$$

The values for the $a$ and $b$ subscripts of the above formula vary depending on the relative proportions of the magnesium-bearing and manganese-bearing materials, and silica-bearing material employed.

The resulting initially fired pressed blocks, following cooling thereof, are granulated or pulverized, and ground to fine particle size, e.g., below about 5 microns, preferably although not necessarily, again mixed with fugitive organic binders of the types noted above and in the above noted amounts, and the mixture granulated, e.g., by pressing granulation, as through a screen, and the resulting powder is then pressed into blocks or plaques at pressures, e.g., ranging from about 2,000 to about 20,000 p.s.i., and when employing such binders, are fired first at temperature of the order of about 400 to about 600° C. for a period of about 15 minutes to about 4 hours, to remove the organic binder. The pressed plaques are then sintered at temperatures of the order of about 1,000 to about 1,300° C., preferably about 1,100 to about 1,225° C., for a period of from about 5 minutes to about 8 hours to form the magnesium silicate-manganese silicate composition into the desired structure, that is in the form of porous members or membranes having the required characteristics of strength, alkali resistance, and resistivity, as noted above, for use as battery separators.

The resulting porous sintered separators are generally in the form of a solid solution of magnesium silicate and manganese silicate having a composition ranging from about 5 to about 99 mol percent magnesium silicate and about 1 to about 95 mol percent manganese silicate, such ranges preferably being from about 50 to about 98 mol percent magnesium silicate and about 2 to about 50 mol percent manganese silicate.

As will be pointed out below, it has been found that the resulting separators not only possess the ability to markedly reduce and substantially eliminate gassing when in contact with a zinc electrode in a battery, thereby permitting hermetic sealing of the battery and affording very long cycle life, but in addition such separators have low resistivity which can range from about 5 to about 50 ohm-cm., providing high electrical efficiency, relatively high transverse strength or modulus of rupture ranging from about 5,000 up to about 15,000 p.s.i., a porosity corresponding to a water absorption ranging from about 5 to about 50%, preferably about 7 to about 25%, and have high resistance to alkali. In addition to markedly reducing gassing when in contact with a zinc electrode, the magnesium silicate-manganese silicate separators of the invention inhibit formation of zinc dendrites when in contact with a zinc electrode in a battery, thereby further aiding in prolonging battery life.

The magnesium silicate-manganese silicate separator material produced according to the invention and converted or granulated to a ground particulate form, can be employed as inorganic separator material used in flexible separators, generally comprised of said separator material in particulate form distributed uniformly in a polymeric organic binder.

These include, for example, the flexible separators described in the copending application, Ser. No. 676,224, filed Oct. 18, 1967, of C. Berger et al., now abandoned, and consisting, for example, of a porous inorganic material, which can be the above noted magnesium silicate-manganese silicate improved separator material of the present invention, and a minor portion of a water coaguable organic fluorocarbon polymer such as a vinylidene fluoride polymer, to bond the particles of the inorganic material.

Also, the above noted particulate magnesium silicate-manganese silicate separator material produced according to the invention can be employed as the inorganic material in the flexible separators described in the copending application, Ser. No. 676,223, filed Oct. 18, 1967, of F. C. Arrance, now Pat. No. 3,542,596, and consisting for example of a major portion of such inorganic material, e.g., the above noted magnesium silicate-manganese silicate separator material of the invention, a minor portion of potassium titanate, and a minor portion of a cured organic polymer such as polyphenylene oxide as binding agent.

Further, the improved inorganic separator material of the present invention can be applied in the copending application, Ser. No. 707,808, filed Feb. 23, 1968, of F. C. Arrance et al., now abandoned in favor of continuation application Ser. No. 154,218, filed June 17, 1971, disclosing an improved flexible porous separator, which can be box-shaped to provide a compartment for a battery electrode, produced by applying on a flexible porous substrate, such as flexible sheets or mats of various materials including potassium titanate paper, asbestos, aluminosilicate sheets, and the like, a film comprising a mixture of a magnesium silicate-manganese silicate separator material according to the invention, and an organic polymeric bonding agent of various types, such as polyphenylene oxide, or a fluorocarbon polymer such as vinylidene fluoride polymer, bonding the particles of the inorganic material together with the bonding agent, and forming a porous substantially inorganic separator film on the flexible substrate.

Also, the particulate magnesium silicate-manganese silicate improved separator material of the invention can be employed as the inorganic material in producing the flexible microporous separator film described in copending application, Ser. No. 27, 577, filed Apr. 13, 1970, by M. P. Strier and J. S. Smatko, which consists essentially of an organic polymer such as polytetrafluoroethylene, having particles of such inorganic material uniformly distributed in said film.

In addition, the particulate magnesium silicate-manganese silicate separator material of the invention can be employed for producing a flexible porous separator according to the principles of copending application, Ser. No. 829,573, filed June 2, 1969, of F. C. Arrange et al., now Pat. No. 3,625,770, by applying a mixture of such material and an organic polymeric bonding agent such as polyphenylene oxide to a flexible fuel cell asbestos matrix, previously impregnated with polyphenylene oxide.

The following are examples illustrating practice of the invention:

EXAMPLE 1

The following mixture of component is prepared:

| Components | Weight percent | Weight grams |
|---|---|---|
| MnO₂ (pyrolusite) | 3 | 6 |
| SiO₂ | 42 | 84 |
| MgO | 55 | 110 |
| Total | 100.0 | 200 |

The high purity pyrolusite, finely ground glass-makers sand (SiO₂), and magnesia are ground in a ball mill for 30 hours in water. The product is filtered, and the cake is dried in an oven at 100° C. The dried cake is crumbled and mixed into a paste with 6 grams of paraffin wax dissolved in toluene. The thick paste is dried in an air draft of a hood at ambient temperature. The resulting crumbs are pressed at 15,000 p.s.i. into blocks or slugs, which are placed into crucibles. They are fired in a gas-fired furnace at 1,400° C. for 6 hours.

The hard, porcelain-like blocks are ground to 16 mesh in a Bico Pulverizer, and the granular material is then ball-milled in acetone for 56 hours. This product is filtered, and the damp cake is mixed with 8 grams, which is about 4% of the inorganics by weight, of Carbowax-4000, a polyethylene glycol, dissolved in 60 cc. of acetone. The resulting thick paste is allowed to dry in an ambient air stream. The resulting crumbs are granulated through screens and the fraction through a 60 mesh screen and retained on 150 mesh is used as a pressing granulation. Plaques are pressed at 8,000 p.s.i., and fired in an electric furnace for ½ hour at 500° C. to remove the binder, and then fired at 1,200° C. for 15 minutes to yield separators having a porosity corresponding to a water absorption of 8.91%, an apparent density of 2.40, and a resistivity of 30.1 ohm-cm. in 30% KOH. The separators contain 95 mol percent magnesium silicate and 5 mol percent manganese silicate.

EXAMPLE 2

The following mixture of components is prepared:

| Components | Weight percent | Weight grams |
|---|---|---|
| Talc | 59.3 | 189.7 |
| MgO | 26.3 | 84.1 |
| MnCO₃ | 14.4 | 46 |
| Total | 100.0 | 319.8 |

The above components are ball-milled in water for 24 hours, with filtration following, to produce a damp cake, which is sluried with 100 cc. of water, containing 6 grams DuPont "Elvaonol 51–05, which is a polyvinyl alcohol. The mix is dried to a moisture content of 6%. The cake is crumbled and pressed into blocks at 20,000 p.s.i., and then fired in a gas-fired furnace to 1,390° C. for 8 hours.

The cooled, hard almost glass-like blocks are crushed to 16 mesh in a Bico Pulverizer. The granular material is then ball-milled for 60 hours in hexane, followed by filtration to form a damp cake. The cake is mixed with 18 grams (about 6% of the inorganics by weight) paraffin wax dissolved in 100 cc. of hexane. The pasty mass is dried in a hood, and the resulting crumbs are granulated as in Example 1.

Plaques are pressed at 5,000 p.s.i., and fired in an electric furnace, first for ½ hour at 500° C. to remove the wax and then at 1,195° C. for 15 minutes to yield plaques averaging about 11% water absorption and apparent density of 2.30. Modulus of rupture average 13,800 p.s.i. Resistivity ranges from 19.8 to 22.1 ohm-cm. The plaques contain 90 mol percent magnesium silicate and 10 mol percent manganese silicate.

EXAMPLE 3

The following mixture of components is prepared:

| Components | Weight percent | Weight grams |
|---|---|---|
| $MnO_2$ | 14.1 | 70 |
| $SiO_2$ | 24.1 | 120 |
| $MgCO_3$ | 61.8 | 308 |
| Total | 100.0 | 498 |

The dry components are dry mixed in a powder blendor for ½ hour. Enough water is added in small portions while mixing, to generate a rather stiff paste. One of the portions of water contains 15 grams of Carbowax-4000 dissolved therein. After thorough mixing for ½ hour, the mass is placed in a shallow stainless steel pan, and dried in an oven at 100° C.

After cooling, the crumbs are pressed into blocks at 20,000 p.s.i., followed by firing at 1,310° C. for 6 hours. The fired, hard porcelain-like mass is pulverized in a Bico Pulverizer to about 16 mesh size. The granular material is then ball-milled in acetone for 56 hours, followed by filtration. The filter cake is dried in a hood at ambient temperature. The dried cake is mixed to a stiff paste with a solution of binders in toluene, the binder components comprising equal parts camphor, stearic acid, beeswax, and paraffin wax. The total amount of binder is 14 grams (about 5% of the inorganic powder). The mix is dried, and crumbs are granulated through screens to yield a pressing granulation between 60 mesh and 150 mesh. It is to be understood that any other method of granulation, such as spray drying can be used.

The pressing granulation is used to press plaques at 7,500 p.s.i., which are fired in an electric furnace at 1,165° C. for 15 minutes to yield separators having a porosity corresponding to an average water absorption of 12%, an average apparent density of 2.27 g./cc. and an average electrical resistivity in 30% KOH of 17.3 ohm-cm. Modulus of rupture averages 13,700 p.s.i. The separators contain 80 mol percent magnesium silicate and 20 mol percent manganese silicate.

EXAMPLE 4

The following mixture of components is prepared, as described below:

| Components | Weight percent | Weight grams |
|---|---|---|
| $MnCO_3$ | 32.3 | 138 |
| $MgCO_3$ | 19.5 | 77 |
| Sodium silicate solution tech. grade approx. 40% $Na_2Si_3O_7$ equivalent | 48.2 | 200 |
| Total | 100.0 | 415 |

The sodium silicate solution is diluted with 2 parts water. Separately, 21 grams of glacial acetic acid is mixed with 80 cc. water. The acid solution is added slowly to the sodium silicate solution under vigorous stirring. After the addition is complete, the stirrer is stopped, to allow the solution to slowly gel. When an apparent viscosity approximating honey is reached, the remaining dry ingredients are added under vigorous stirring. Stirring is continued for 1 hour to be assured of a homogeneous mix. The viscosity of the gel is sufficient to prevent significant settling of the dry powder ingredients.

Then the mixture is placed in Teflon coated pans, and dried in an oven at 100° C. The dried chip-like material is extracted with cold water by stirring slowly in a container with 3 liters of water. This extraction is repeated 4 times. This operation serves to remove most of the sodium salts. After extraction, the chips are dried once more at 100° C.

The dried chips are ball-milled for 8 hours in heptane, followed by filtration. The damp cake is mixed with 9 grams of a 50–50 mixture of beeswax and paraffin wax, dissolved in 100 cc. of toluene. The paste is dried in a hood, and the crumbs resulting therefrom are consolidated into blocks at 18,000 p.s.i. The blocks are fired in an electric furnace at 1,270° C. for 6 hours, and upon cooling they are pulverized to approximately 16 mesh in a Bico Pulverizer. The granulate material is ball-milled in acetone for 48 hours, followed by filtration. The damp cake is mixed into a paste with 13 grams of Carbowax-4000 dissolved in warm acetone (80 cc.). The paste is dried at room temperature in a hood.

The resulting crumbs are granulated on screens to yield a pressing granulation between 60 mesh and 150 mesh, and separator plaques are pressed from this mass, and the plaques fired in an electric furnace at 1,150° C. for 15 minutes. It is noted that the plaques have a brownish color due to a higher oxidation state of the manganese. Refiring at 1,000° C. for 2 hours in a stream of $CO_2$ containing a trace of methanol vapor results in plaques having a slight pinkish-light beige color. A small amount of another suitable reducing agent such as a trace of natural gas, ethanol, CO, $H_2$ are equally satisfactory. The separators have a porosity corresponding to a water absorption averaging 13%, 2.22 g./cc. apparent density, and resistivity in 30% KOH of 13.1 ohm-cm. Modulus of rupture averages 13,100 p.s.i. The separators contain 40 mol percent magnesium silicate and 60 mol percent manganese silicate.

EXAMPLE 5

The following mixture of components are prepared:

| Components | Weight percent | Weight grams |
|---|---|---|
| Magnesium trisilicate | 62.1 | 133.6 |
| $MnO_2$ | 24.2 | 52.2 |
| MgO | 13.7 | 29.8 |
| Total | 100.0 | 215.6 |

The materials are dry blended for ½ hour, followed by hand mixing into a paste with acetone, containing 10 grams Carbowax-4000. The paste is dried in an ambient air stream through a hood. The resulting crumbs are compacted at 20,000 p.s.i. into blocks, which are fired in crucibles in an electric furnace for 6 hours at 1,250° C.

The product is cooled and pulverized to approximately 16 mesh in a Bico Pulverizer, and is then further reduced in particle size by 14-hour ball-milling in acetone, followed by filtration. The filter cake is dried, and again made into a paste with acetone containing 5 grams Carbowax-4000.

Again the paste is compressed into blocks and refired for another 6 hours at 1,250° C. to complete the reactions among the components. The refired blocks, after cooling are ground in a Bico Pulverizer to 16 mesh, and the granular product then ball-milled in hexane for 50 hours, followed by filtration. The filter cake is dried in ambient air in a draft, and the dry material crumbled in a mortar and pestle.

To the powder is added 12 grams (7.5% by weight of inorganics) of "Mobilcer-C," a wax emulsion in water, and enough water to make a stiff paste, which is dried in an air draft. The crumbs are granulated through sieves to yield a pressing granulation between 60 mesh and 150 mesh. Plaques are pressed from this at 10,000 p.s.i., and fired in an electric furnace in air, first at 500° C. for ½ hour to eliminate the volatiles, then at 1,175° C. for 14 minutes to give separators averaging 10.7% water absorption, 2.36 g./cc. apparent density, and 21.8 ohm-cm. resistivity in 30% KOH. The separators contain 70 mol percent magnesium silicate and 30 mol percent manganese silicate.

EXAMPLE 6

The following mixture of ingredients is prepared:

| Components | Weight percent | Weight grams |
|---|---|---|
| $Mn(NO_3)_2$ solution (52%) | 16.7 | 86 |
| $Mg(NO_3)_2 \cdot 6H_2O$ | 73.6 | 380 |
| Cab-O-Sil | 9.7 | 50 |
| Total | 100.0 | 516 |

The Cab-O-Sil (colloidal silica) is made into a paste with about 250 cc. water. Separately, the magnesium nitrate is dissolved in warm water (about 500 cc). To this is added the manganous nitrate solution. Then the Cab-O-Sil suspension is mixed in with vigorous stirring. The whole is brought to a volume of about 1,700 cc. with water.

Ammonium hydroxide (29% $NH_3$ assay) is diluted with water (235 cc. of the ammonium hydroxide with an equal amount of water) to form a precipitating solution. This solution is added under vigorous stirring to the aforementioned mixture of salts and Cab-O-Sil, in a slow stream. Stirring should be vigorous enough to readily break up the curds that form. The result is a thick mass, which is poured into Teflon coated pans, and the material is dried in an oven at 100° C. The product dries to very dark brown chips. These are broken into rice-size granules, which are sprayed with water until a 4–6% weight gain is achieved, and the granules are stored in a sealed container or plastic bag for 24 hours to condition them. The conditioning process permits the water to distribute uniformly throughout.

These conditioned granules now are pressed without additional binder into blocks at 18,000 p.s.i. The blocks are broken into about ⅜-inch size pieces, and fired at 500° C. for 3 hours to eliminate the ammonium nitrate. Then they are fired at 1,260° C. for 6 hours. The lumps, after cooling are ground in a Bico Pulverizer to about 16 mesh, and the resultant granules are further ball-milled in heptane for 50 hours. The product is filtered and the wet cake made into a thick paste with a binder dissolved in hot toluene, the binder consisting of low-density polyethylene and paraffin wax in equal amounts, previously melted together and thoroughly homogenized. The amount of binder is about 6.3 grams (equivalent to about 5% of the weight of the inorganics). After drying, the crumbs are granulated to a pressing granulation in the range 60 mesh to 150 mesh.

This fraction is pressed into separator plaques, which are fired first at 500° C. for ½ hour in air, followed by 13 minutes at 1,175° C. The resulting separators average 11.6% water absorption, 2.31 g./cc. apparent density, and a resistivity of 18.7 ohm-cm. Modulus of rupture averages 13,800 p.s.i. The separators contain 85 mol percent magnesium silicate and 15 mol percent manganese silicate.

EXAMPLE 7

Balsam Gap natural olivine (A) having the composition 47–49% MgO, 7–9% FeO and 30–41% $SiO_2$, and prefired Balsam Gap olivine (B) produced substantially according to the procedure described in the above Patent 3,446,668, by firing the Balsam Gap olivine at temperature of about 1,300° C. are provided. There is also provided the magnesium silicate-manganese silicate solid solution material of Example 6 above, granulated and in particulate form, such mixture designated (C).

Samples of mixtures (A) and (B) are compacted at about 8,000 p.s.i. into flat members and the respective members formed of these two compositions are each subjected to firing in air at 1,100° C. for 6 hours. Following such firing of compositions (A) and (B), these samples are granulated.

The above noted fired mixtures of materials (A) and (B), and mixture (C) are respectively mixed with 68.4% zinc powder by weight of the mixture, and the respective mixtures compressed at about 18,000 p.s.i. into pellets, and such pellets contacted under the same conditions with 30% KOH solution at ambient temperature. Further, a zinc blank is pelleted in the same manner and contacted with the same concentration KOH solution. The gas produced in each test is collected and measured with respect to time.

The materials tested, color of the materials both before and after heating, and the amount of gas collected at various specified times from the reaction of the respective pellets contacted with the KOH solution, are set forth in the table below:

TABLE

| Test No. | Starting material | Firing atmos. | Color Before heating | Color After heating | Gas collected (cc.) after— 1 hr. | 2 hrs. | 6 hrs. | 24 hrs. | 48 hrs. |
|---|---|---|---|---|---|---|---|---|---|
| 1 | Balsam gap olivine (B) prefired | Not refired | Red brown | | 66 | 108 | 220 | 431 | 559 |
| 2 | Galsam gap olivine (A) | Air | Off-white | Red-brown | 114 | 154 | 252 | 467 | |
| 3 | Balsam gap olivine (B) prefired | Air | Red-brown | do | 87 | 139 | 260 | 522 | |
| 4 | Magnesium silicate-manganese silicate (C) | | | | 0.0 | 0.0 | 0.8 | 1.6 | 3.5 |
| 5 | Zinc blank | | | | 0.0 | 0.0 | 0.3 | 1.5 | 3.0 |

Results from the above table show greatly reduced gassing rates corresponding to substantially complete elimination of gassing for the magnesium silicate-manganese silicate material (Test 4), as compared to the Balsam Gap olivine prefired material (B) produced according to the above patent, and which is not refired (Test 1), or the material (B) which is refired in air (Test 3), or the Balsam Gap olivine (A) material which is fired in air (Test 2), in the presence of the zinc in alkali. Thus, it is noted that the gassing rates for the magnesium silicate-manganese silicate material (C), according to the present invention (Test 4), at the end of 6 hours, 24 hours and 48 hours is only 0.8, 1.6 and 3.5 cc., cc., as compared, for example, to 220, 431 and 559 cc., respectively (Test 1), for the olivine (magnesium silicate-iron silicate) material (B) produced according to the above patent, and which is not refired. Even greater gassing is produced when material (B) of the above patent is refired and when the raw olivine material (A) is fired according to Tests 2 and 3 of the table.

Thus, for practical purposes, it is seen that the magnesium silicate-manganese silicate separator of the present invention substantially eliminates gassing when in contact with the zinc. This is clearly indicated by the fact that the zinc blank alone (Test 5) in contact with alkali produced about the same amount of gassing as in the case of the zinc in contact with the magnesium silicate-manganese slicate separator of the invention (Test 4).

EXAMPLE 8

The sintered separtor plaques of Example 6 are ground, ball milled and dried. 80 parts by weight of such separator material are mixed into a solution containing, by weight, 10 parts polyphenylene oxide, 10 parts polypropylene polyazelate, marketed as Plastolein 9750 by Emery Industries, Inc., dissolved in approximately 93 parts chloroform. This mixture is ball-milled 16 hours to form a smooth product of paint-like consistency. It is coated on 10 mil-thick fuel-cell asbestos sheets, previously dipped in a 2% polyphenylene oxide polymer solution in chloroform and dried. The liquid coating is adjusted to form a dried film about 5 mils thick. The sheets so prepared after drying are now flexible separators suitable for high energy density batteries, and having the substantially non-gassing characteristics in the presence of zinc and alkali, of the magnesium silicate-manganese silcate separators of the invention.

EXAMPLE 9

The sintered magnesium silicate-manganese silicate separator plaques produced in Example 6 are ground and ball milled to fine particle size.

The material is then processed according to Example 1 of above copending application, Ser. No. 27,577, to produce a substantially non-gassing separator in the following manner. An amount of 335 grams of such fine particle size magnesium silicate-manganese silicate is suspended in 225 grams water to form a 60% suspension by weight. An amount of 237.4 grams of Du Pont T–30B TFE aqueous emulsion of polytetrafluoroethylene (60.4% solids content) is added slowly to the magnesium silicate-manganese silicate dispersion.

After about 20 to 30 minutes of stirring, the resulting homogeneous slurry or aqueous dispersion is poured on a pyrex glass plate, and is drawn down by means of a doctor blade set at 0.038 cm. (15 mils). The resulting film is dried initially for about 15 minutes in the draft of a laboratory hood at about 70° F., and further dried at ambient room temperature for 15 hours. The dried film is then sintered at 360° F. for 20 minutes. About 12 grams of glycerine is added to the slurry prior to casting, per 100 ml. of such mixture, to improve film properties and prevent cracking during the following sintering operation.

The resulting sintered film formed of about 70% magnesium silicate-manganese silicate and about 30% polytetrafluoroethylene, is highly flexible, has uniform distribution of the inorganic particles, and has good stability in aqueous KOH solution at 50 to 100° C.

EXAMPLE 10

Referring to the accompanying illustrative drawing, the separators produced according to Example 6 are assembled in a three electrode battery of the type indicated at 10, each consisting of two silver electrodes 12 and one zinc electrode 14, with the zinc electrode sandwiched between two of the magnesium silicate-manganese silicate separators 16 produced according to Example 6 above, one separator opposite each face o fthe zinc electrode, such separators contacting the adjacent silver electrodes. The two silver electrodes are connected via lead 18 to a battery terminal 20, and the zinc electrode is connected via a lead 22 to the battery terminal 24. The battery is filled with 30% KOH.

Three separate batteries having the above described construction are provided, and are tested using a cycling regime of one hour discharge and three hours charge per cycle. The batteries or cells have a 1.1 ampere-hour nominal original capacity.

Discharge of the cells is to 50% depth of discharge and recharge is to a maximum voltage of 2.09 volts per cell. Usually about 3 to about 5% overcharge is supplied to the cells.

Using the above noted cycling regime, one of the above described batteries employing the magnesium silicate-manganese silicate separators of Example 6, operates for about 810 cycles a second of such batteries for about 890 cycles, and the third for about 970 cycles, with substantially no gassing in any of these batteries.

Although the improved magnesium silicate-manganese silicate separators produced according to the invention are particularly advantageous when employed with a zinc electrode to markedly reduce or substantially eliminate gassing tendency as compared to the magnesium silicate-iron silicate separator of the above patent, it will be noted that the improved separators of the present invention can also be utilized in high energy density batteries containing electrodes other than zinc electrodes, for example, in a nickel-cadmium or silver-cadmium battery, with advantageous results in providing reduction of dendrite growth on prolonged cycling.

In view of the foregoing, it is seen that the invention provides procedure for producing substantially non-gassing efficient separators, particularly when employed with a zinc electrode, permitting the provision of hermetically sealed long lived secondary batteries, such as efficient sealed silver-zinc and nickel-zinc batteries. In addition, the magnesium silicate-manganese silicate separators of the invention have good transverse strength, low resistivity, and inhibiting effect on zinc dendrite formation, and high alkali resistance.

While I have described particular embodiments of the invention for purposes of illustration, it will be understood that various changes and modifications can be made therein within the spirit of the invention, and the invention acocrdingly is not to be taken as limited except by the scope of the appended claims.

I claim:

1. A substantially non-gassing battery separator when employed with a zinc electrode, in the form of a porous member having a composition consisting essentially of sintered particles of a solid solution of about 5 to about 99 mol percent magnesium silicate and about 1 to about 95 mol percent manganese silicate, said separator having a porosity corresponding to a water absorption ranging from about 5% to about 50%.

2. A battery separator as defined in claim 1, said solid solution consisting essentially of about 50 to about 98 mol percent magnesium silicate and about 2 to about 50 mol percent manganese silicate.

3. A battery separator as defined in claim 1, said separator having a modulus of rupture ranging from about 5,000 to about 15,000 p.s.i. and a resistivity ranging from about 5 to about 50 ohm-cm.

4. A flexible battery separator as defined in claim 1, said sintered composition in particulate form being distributed uniformly in a polymeric organic binder.

5. A flexible battery separator as defined in claim 2, said sintered composition in particulate form being distributed uniformly in a polymeric binder selected from the group consisting of polyphenylene oxide and polytetrafluoroethylene.

6. In a battery containing a zinc electrode, a substantially non-gassing battery separator as defined in claim 1.

7. In a battery as defined in claim 6, said solid solution consisting essentially of about 50 to about 98 mol percent magnesium silicate and about 2 to about 50 mol percent manganese silicate.

8. In a battery as defined in claim 6, said zinc electrode being positioned on one side of said separator and including a silver electrode positioned on the opposite side of said separator.

9. A process for producing a substantially non-gassing separator when employed with a zinc electrode, and having good resistance to alkali, which comprises sintering a compacted magnesium silicate-manganese silicate composition at temperature ranging from about 1,000 to about 1,300° C., wherein said magnesium silicate-maganese silicate composition consists essentially of about 2 to about 57% magnesium calculated as MgO, about 1 to about 68% manganese calculated as MnO, and about 15 to about 55% silica (SiO$_2$), by weight.

10. The process as defined in claim 9, wherein said magnesium is present as MgO and said manganese is present as MnO$_2$.

11. The process for producing a substantially non-gassing separator when employed with a zinc electrode, and having good resistance to alkali, which comprises compacting a mixture of about 2 to about 57% mangesium-bearing material calculated as MgO, about 1 to about 68% of a manganese-bearing material calculated as MnO, and about 15 to about 55% silica, by weight, initially firing said compacted mixture at a temperature in the range of about 1,100 to about 1,400° C., granulating the resulting fired composition, compacting said granulated composition, and sintering said last mentioned compacted composition at temperature ranging from about 1,000 to about 1,300° C., to produce said separator.

12. The process as defined in claim 11, wherein said initial firing is carried out at temperature ranging from about 1,300 to about 1,400° C.

13. The process as defined in claim 11, including incorporating an organic binder in said mixture prior to said sintering.

14. The process as defined in claim 11, including adding about 2 to about 10% of an organic binder by weight of total inorganics to said mixture and compacting said mixture prior to said initial firing at about 1,100 to about 1,400° C., and including incorporating about 2 to about 10% of an organic binder in said compacted magnesium silicate-iron-silicate composition by weight of total inorganics, prior to said subsequent sintering from about 1,000 to about 1,300° C.

15. The process as defined in claim 14, including pressing said mixture into blocks prior to said initial firing, granulating said blocks following said initial firing, incorporating said organic binder in the resulting granular mixture of magnesium silicate-manganese silicate composition, and pressing said last mentioned mixture into plaques, followed by said sintering said plaques at a temperature ranging from about 1,000 to about 1,300° C.

16. The process as defined in claim 15, wherein said initial firing is carried out at temperatures ranging from about 1,300 to about 1,400° C. for a period of about 1 to about 8 hours, and said subsequent sintering is carried out at temperatures ranging from about 1,100 to about 1,225° C. for a period of from about 5 minutes to about 8 hours.

17. The process as defined in claim 16, said starting mixture consisting essentially of about 23 to about 56% magnesium-bearing material calculated as MgO, about 2 to about 41% of a manganese-bearing material calculated as MnO, and about 25 to about 48% silica, by weight.

18. In a battery as defined in claim 6, said zinc electrode being positioned on one side of said separator and including a nickel electrode positioned on the opposite side of said separator.

References Cited
UNITED STATES PATENTS

| | | | |
|---|---|---|---|
| 3,364,077 | 1/1968 | Arrance et al. | 136—146 |
| 3,446,668 | 5/1969 | Arrance et al. | 136—146 |

OTHER REFERENCES

Phase Diagrams for Ceramists, by Levin et al., copyright 1964, p. 242.

ALLEN B. CURTIS, Primary Examiner

H. A. FEELEY, Assistant Examiner

U.S. Cl. X.R.

136—146, 148; 106—58